No. 704,530. Patented July 15, 1902.
S. L. FRASER.
STOCK FOOD AND PROCESS OF MAKING SAME.
(Application filed Apr. 26, 1899.)
(Specimens.)
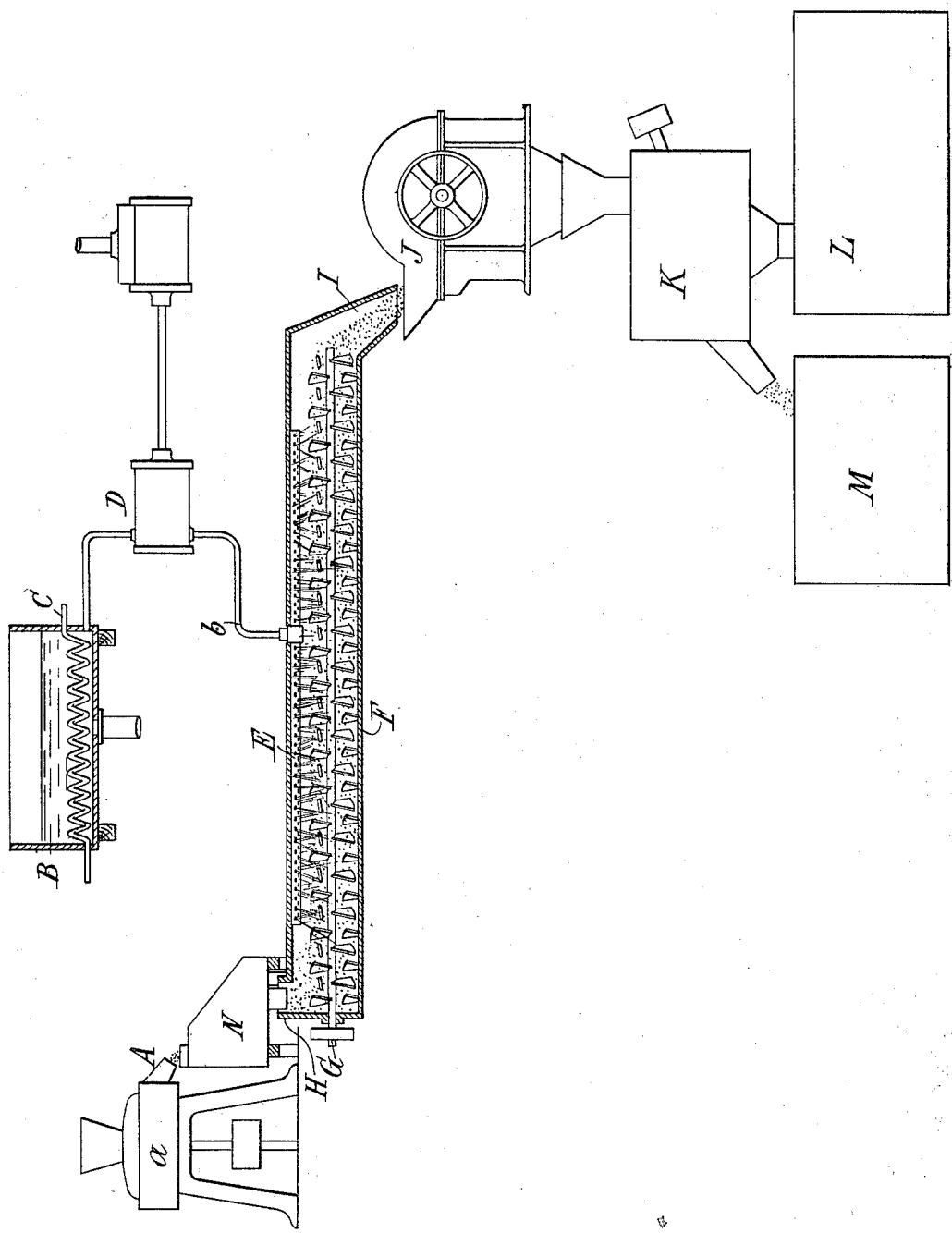
WITNESSES:
Fred White
Thomas F. Wallach
INVENTOR:
Spencer L. Fraser,
By his Attorneys,
Arthur C. Fraser & Co.

UNITED STATES PATENT OFFICE.

SPENCER L. FRASER, OF CHICAGO, ILLINOIS, ASSIGNOR OF ONE-TENTH TO SOPHRONIA DEMAREST FRASER, OF CHICAGO, ILLINOIS.

STOCK-FOOD AND PROCESS OF MAKING SAME.

SPECIFICATION forming part of Letters Patent No. 704,530, dated July 15, 1902.

Application filed April 26, 1899. Serial No. 714,515. (Specimens.)

*To all whom it may concern:*

Be it known that I, SPENCER L. FRASER, a citizen of the United States, residing at Chicago, in the county of Cook and State of Illinois, have invented a certain new and useful Process of Preparing Food for Live Stock and the Product Thereof, of which the following is a specification.

This invention relates to granular or comminuted food for live stock.

The object of the invention is to combine with a farinaceous or fibrous vegetable base a suitable proportion of molasses. The value of molasses as an alimentary substance for live stock has long been known, and heretofore it has been common with stock-raisers to mix a small proportion of molasses at ordinary temperature with a suitable base—as corn, oats, bran, linseed-meal, comminuted cornstalks, or other substances—and to immediately feed the same to stock. It has also been proposed to make a similar mixture and then bake or roast the mass in order to caramelize the molasses, after which the product has been broken or ground to comminute it. This makes a food of bitter flavor not relished by cattle, and the nutritive properties of the molasses are impaired. It has also been proposed to make hot mixtures of molasses and various alimentary bases for making pressed feed or feed-cakes, which are broken up, ground, or dissolved before feeding to the stock. Cooked foods, such as brewer's grains, &c., have also been mixed with molasses and compressed into cakes. Various other attempts have been made to utilize molasses, but the products have not been satisfactory.

My invention provides a cheap, simple, and feasible process which avoids caramelizing the molasses, avoids baking or roasting the alimentary base, and produces a distinctively homogeneous product of fine quality and flavor, which is highly palatable to live stock.

In carrying out my invention I thoroughly commingle hot cooked molasses with a cold or uncooked granular fibrous or comminuted base. I cook the molases by heating it for a short time prior to mixing to a temperature which may vary from, say, 180° to 230° Fahrenheit, the preferable temperature being from 210° to 220°. This hot molasses I introduce, preferably, by spraying it under pressure onto the base during agitation of the latter. The base is rapidly and continuously stirred during and subsequent to the addition of the molasses to thoroughly incorporate the latter and distribute it uniformly through the mass. The base during mixing is somewhat heated by the spraying of the hot molasses into it; but this heating is not sufficient to impair its character or quality. This operation is preferably performed in a stirrer or conveyer, from which the material is continually discharged. At this stage the material is warm and has the appearance of a mass of brown sugar, is of fine granular form, and when squeezed in the hand may be compacted into a crumbly mass, which sticks together very much like slightly-damp meal. The mass then requires to be dried in such manner as to prevent its forming into lumps to cause the moisture of the molasses to be absorbed or evaporated; but without the application of heat, or at least of such heat as would caramelize the molasses or bake the product. Its formation in lumps must be avoided, as such lumps are liable to sour or ferment and impart an acid, acrid, or moldy flavor which would impair the feed or render it unfit for use. This drying may be performed in any known drying apparatus whereby the material may be subjected for a considerable time to a moderate and controllable heat. Under suitable conditions the resulting product is non-adhesive, dry, and granular, and is homogeneous, the molasses being thoroughly disseminated or distributed throughout the mass and adhering to or coated on the fibrous or base material. Should the substances used as a base be unduly fine or contain considerable dust, which is undesirable, because affecting the respiratory organs of animals, all this dust will be collected and united by the molasses, and the resulting product will be of fine granular condition, the finer particles or dust being cemented by the molasses to the coarser particles.

An important feature of my invention resides in a special mode of drying, whereby the material is converted from the warm slightly-moist adhesive condition which results from the mixing with the base material of the hot molasses to the dry granular condition of the finished product. According to this part of my invention I deposit the material immediately after the mixing and thorough-stirring operation in a curing-bin, wherein it is stored in mass for a sufficient time to effect complete curing—say for twenty-four hours or preferably longer. At the end of this curing operation the material is removed from the bin. The result of the curing operation is that the material is cool and granular, being dry and mellow, but not harsh, and having lost its sticky property, so that the particles will not stick together at all. The curing avoids the formation of lumps, and should any lumps form by the pressure of a large quantity in the bin, instead of being hard and agglutinated and internally soured or musty, they are friable and readily crumble by handling and are of a character perfectly homogeneous with the remainder of the mass. After curing the material is slightly lighter in color than when first mixed.

After drying the material may be subjected to disintegration, if desired. For this purpose the material may be passed through any suitable disintegrator or pulverizer.

In producing my improved product I prefer to use from five per cent. to twenty-five per cent., by weight, of centrifugal molasses and from ninety-five per cent. to seventy-five per cent. of base, which latter may be composed of a single absorbent vegetable, cereal, or fibrous material, or of a mixture of a plurality of such ingredients in desired proportions, according to the character of feed desired. As one example of what is known as "balanced food rations," I may use equal parts of a fibrous material, such as finely-ground straw or cornstalks, and a cereal, such as raw ground corn and oats, and mix with ninety per cent. of this base ten per cent. of molasses, which will make a highly-nutritious and very desirable feed for cattle.

In the accompanying drawing I have shown an apparatus devised by me with a view to the carrying out of the process herein set forth. This apparatus is herein set forth solely in order that the best mode known to me of applying my improved process may be so disclosed that those skilled in the art may be able to perform the same.

In the drawing, A represents any suitable source of supply for the base substance, that shown being the discharge-spout of a pulverizing-mill a.

B indicates a molasses-tank.

C is a suitable heater for the molasses, a steam-coil being shown.

D is a pump or other means for feeding the molasses under pressure.

E is a spraying or distributing discharge-pipe for the molasses.

F is a mixing-chamber. G is a mixing-conveyer therein.

H is the inlet-hopper of the chamber F. I is the discharge-spout thereof, and L is the curing-bin for receiving the mixed product.

In carrying out my process with the installation shown the base is introduced into the mixing-chamber F, and while it is being agitated and propelled forward therein the molasses is sprayed upon it through the perforations in the discharge-pipe E. The base may be reduced to the desired state of subdivision at any time prior to its introduction into the mixing-chamber, and it may be so reduced by the mill immediately prior to such introduction. The base may pass from the mill through a bolter N before entering the hopper H. The molasses is heated in a proper receptacle, as the vessel or tank B, and in any suitable manner, as by the heating-coil C, to a temperature of from say, 180° to 230° Fahrenheit, preferably to 210°. In this condition it is introduced into the base, preferably in a fine spray, under considerable pressure, while the base is being agitated in the mixer. The molasses is preferably introduced in a continuous spray, and the base is preferably continuously agitated and fed past the molasses during introduction, to accomplish which in the construction shown the mixing-chamber and mixer are in the nature of a mixing-conveyer, receiving untreated base at one end and discharging the mixed base and molasses at the other end. At this point the mixture may pass at once to a bin, such as L, and there be permitted to cure for twenty-four hours or longer, preferably for about three days, when it will be ready for use. As it is sometimes desirable to grade the product or further reduce it in size or to eliminate any balls which may have been formed, I have shown a disintegrator or pulverizer J and a bolter K, which latter may separate out the coarse particles or tailings, which may be collected in the bin M. The material may be pulverized, disintegrated, or bolted as it is discharged from the mixer, or all pulverizing, disintegrating, or bolting of the product may be omitted, this being unnecessary for some foods. The question whether the material shall be either disintegrated or bolted, or both, will be determined by the particular circumstances of use or the character of the material.

It will be seen that my invention provides improvements of great value and importance which can be readily and advantageously availed of, and it will be understood that my invention is not limited to the particular details of proportion, ingredients, manipulations, or temperatures set forth as constituting the preferred form of the invention, since it can be employed according to such modifications as circumstances or the judgment of those skilled in the art may dictate without departing from the spirit of the invention.

In practicing my invention care should be taken not to heat the molasses above 230° Fahrenheit and not to subject it to heat for too long a time, as neglect of these precautions is liable to result in the molasses solidifying and becoming worthless. The molasses when raised to the proper heat should be used as promptly and continuously as possible.

My invention is to be distinguished from those processes in which molasses or other saccharine matter is converted into caramel either before or after being applied to a fibrous or cereal base. The production of such caramel requires a temperature approximating 400° Fahrenheit, which is very much higher than the temperature to which I heat the molasses in my process. My process retains the sweetness and nutritious qualities of the molasses.

What I claim is—

1. The process which consists in introducing molasses heated to approximately 180° to 230° Fahrenheit into finely-divided dry base material, stirring the mixture to thoroughly incorporate the molasses, and drying it at a low temperature, to produce a dry, pulverulent homogeneous feed containing solidified uncaramelized molasses.

2. The process which consists in introducing molasses heated to approximately 180° to 230° Fahrenheit into finely-divided uncooked dry base material, stirring the mixture to thoroughly incorporate the molasses, and drying it at a low temperature, to produce a dry, pulverulent homogeneous feed containing solidified uncaramelized molasses.

3. The process which consists in introducing molasses heated to approximately 180° to 230° Fahrenheit into finely-divided dry base material, stirring the mixture to thoroughly incorporate the molasses, and then drying at a low temperature leaving the mass to cure for a sufficient time to cause the moisture to be absorbed and the molasses to solidify, whereby to produce a dry, pulverulent, homogeneous feed of wholesome and appetizing flavor.

4. A feed comprising a finely-divided fibrous or absorbent base material, and solidified cooked and uncaramelized molasses, the latter distributed homogeneously throughout the base, and the feed being dry, pulverulent, and of wholesome and appetizing flavor.

5. A feed comprising a finely-divided fibrous or absorbent uncooked alimentary base, and solidified uncaramelized molasses, the latter distributed homogeneously throughout the base and coated on or attached to the particles of the base, the feed being dry, pulverulent, and of wholesome and appetizing flavor.

6. A feed comprising a finely-divided fibrous or absorbent uncooked alimentary base, and ten per cent. or more solidified cooked molasses, the latter distributed homogeneously throughout the base, and the feed being dry, pulverulent, and of wholesome and appetizing flavor.

In witness whereof I have hereunto signed my name in the presence of two subscribing witnesses.

SPENCER L. FRASER.

Witnesses:
FRANK HILL,
F. HILL.